US009257231B2

(12) United States Patent
Haq et al.

(10) Patent No.: US 9,257,231 B2
(45) Date of Patent: Feb. 9, 2016

(54) HIGH ENERGY CAPACITORS

(75) Inventors: Sajad Haq, Glasgrow (GB); Amy Elizabeth Dyke, Aust (GB); Hazel Ann Dyke, Aust (GB); Michael Dunleavy, Bristol (GB); Christopher Richard Spikings, Bradley Stoke (GB)

(73) Assignee: BAE SYSTEMS PLC, London (GB)

( * ) Notice: Subject to any disclaimer, the term of this patent is extended or adjusted under 35 U.S.C. 154(b) by 286 days.

(21) Appl. No.: 14/129,140

(22) PCT Filed: Jun. 15, 2012

(86) PCT No.: PCT/GB2012/051375
§ 371 (c)(1),
(2), (4) Date: Dec. 24, 2013

(87) PCT Pub. No.: WO2012/175938
PCT Pub. Date: Dec. 27, 2012

(65) Prior Publication Data
US 2014/0126108 A1    May 8, 2014

(30) Foreign Application Priority Data

Jun. 24, 2011 (EP) .................................... 11275100
Jun. 24, 2011 (GB) ................................... 1110685.3

(51) Int. Cl.
*H01G 4/06* (2006.01)
*H01G 4/005* (2006.01)
*H01G 4/14* (2006.01)
*H01G 4/28* (2006.01)

(52) U.S. Cl.
CPC ................ *H01G 4/005* (2013.01); *H01G 4/14* (2013.01); *H01G 4/28* (2013.01)

(58) Field of Classification Search
USPC ........................................ 361/326, 311, 303
See application file for complete search history.

(56) References Cited

U.S. PATENT DOCUMENTS

| 6,079,089 | A | 6/2000 | Quick et al. |
| 6,215,648 | B1 | 4/2001 | Quick et al. |
| 6,882,165 | B2 * | 4/2005 | Ogura .................. G01N 27/225 324/663 |

(Continued)

FOREIGN PATENT DOCUMENTS

| FR | 2 447 595 A1 | 8/1980 |
| GB | 1 316 144 A | 5/1973 |
| WO | WO 2010/035461 A1 | 4/2010 |

OTHER PUBLICATIONS

International Search Report (PCT/ISA/210) mailed on Aug. 16, 2012, by the Great Britain Patent Office as the International Searching Authority for International Application No. PCT/GB2012/051375.

(Continued)

*Primary Examiner* — Eric Thomas
(74) *Attorney, Agent, or Firm* — Maine Cernota & Rardin (57) ABSTRACT

The following invention relates to high energy capacitors with increased thermal resilience over conventional bulk ceramic capacitors, particularly capacitors that may be formed into a three dimensional shape to fit inside an existing device. The capacitor is provided with first and second electrodes which have a plurality of interlocating protrusions, which increase the relative surface area of the electrodes. The first and second electrodes and interlocating protrusions are provided with through holes. The devices are filled with a flowable dielectric material.

20 Claims, 5 Drawing Sheets (56) References Cited

U.S. PATENT DOCUMENTS

2010/0080986 A1 4/2010 Iijima et al.
2010/0195263 A1* 8/2010 Sweeney ............... H01G 4/008
361/321.1

OTHER PUBLICATIONS

European Search Report dated Dec. 6, 2011.
Great Britain Search Report dated Oct. 24, 2011.

* cited by examiner

HIGH ENERGY CAPACITORS

The following invention relates to high energy capacitors with increased thermal resilience over conventional bulk ceramic capacitors, preferably capacitors that may be formed into a desired three dimensional shape to fit inside an existing device. There are provided methods of making said capacitors and devices containing said capacitors.

The thermal resilience of the components within high energy capacitors are often prone to cracking and hence failure once they are subject to extreme temperatures. The thermal damage is thought to be a result from the difference in rates of thermal expansion of the ceramic interior and polymer exterior of the bulk ceramic materials currently in use.

The use of polymers and in particular ceramic loaded polymers as the dielectric have provided materials which are easier to process than conventional bulk ceramic capacitors.

As the use and desirability of electrical power trains to power systems, such as vehicles, vessels and crafts increases, so does the requirement for higher energy storage. High energy capacitors are merely one example of a means of short term energy storage. It is also desirable to increase the energy density of a capacitor of a given dimension as space is often limited inside systems.

According to a first aspect of the invention there is provided a capacitor comprising a first electrode comprising at least two protrusions, a second electrode comprising at least two protrusions, which interlocate with the protrusions on said first electrode, and at least one curable dielectric material deposed between said interlocated protrusions of the said first and second electrodes, further wherein there is at least one void in the said first or second electrodes, to allow the curable dielectric material to be flowed therethrough.

One advantage of the use of at least two protrusions, or preferably a plurality of protrusions, is that it increases the available surface area of the first and second electrodes, thereby allowing greater capacitance to be achieved from a defined volume.

The protrusions may take the form of any three dimensional shape provided that the respective shapes of the at least two protrusions on the first electrode and second electrodes are able to interlocate. The protrusions may have cross sections whose sides are parallel, curved, or substantial circular. The protrusions may preferably be in the form of fins or reciprocal male and female parts, more preferably in the form of interlocating fins.

The at least two protrusions on the first and second electrodes are designed such that they can be mated together, i.e. bought together into close alignment such that there is a substantially uniform gap between all of the protrusions on the mated structure, so as to permit a uniform electrical charging on the final capacitor device.

The at least two protrusions on the first and second electrodes may form interlocating patterns, which may be parallel, curved or circular, in a preferred arrangement circular patterns may be co-axially arranged.

The protrusions on the electrodes, of the capacitor according to the invention, may have a patterned structure that would require very intricate machining techniques in order to provide a block of ceramic dielectric that could be inserted between the mated first and second electrodes. The use of a curable dielectric allows the dielectric to be flowed into the gaps between the mated at least two protrusions on the first and second electrodes. The curable dielectric may be selected from a polymer or more preferably ceramic loaded polymer.

The shape of the at least two protrusions were optimised by rounding the edges and vertices, and altering the electrode separation to equalise the field throughout the design and minimise the volume. It was advantageously found that unwanted charge distribution was reduced by removing edges on the at least two protrusions, such that in a highly preferred arrangement the protrusions are provided with a radius. Furthermore it was found that the radius at the tip of said at least two protrusions may advantageously be greater than the thickness of the central shaft or body of said protrusion, such that said protrusions may appear tapered, or have increased radii when viewed in profile. Preferably at least one of the protrusions have an increased radii, such that when the two electrodes are aligned, at least one of the electrodes possess an increased radius. Preferably the increased radii is located at the base of the at least one protrusion.

In a further arrangement the at least one curable dielectric material may be provided by at least two independently selected curable dielectric materials, preferably deposed in a layerwise manner in the device.

The regions of the electrodes with high fields, such a s for example at the base of the first and second electrodes which are proximate to the tips of the adjacent protrusions may be encapsulated with a high breakdown strength material. The high breakdown strength material may be any typical resin, adhesive such as for example epoxy or polyurethane may be used for this purpose as they have been shown to be more resilient and are capable of surviving pulse testing at small separations, such as, for example 1 mm. The remainder of the device may then be filled with a high permittivity dielectric, such as, for example a ceramic loaded polymer in order to obtain the desired capacitance.

The capacitance of a device has been shown to increase, when at least one layer of a high breakdown material has been deposed prior to filling with a dielectric material, improvements from 32 Kv up to 48 Kv breakdown have been observed with this arrangement.

The advantage of using at least one void, more preferably a plurality of voids located in the first and or second electrodes, and or located in the at least two protrusions, is that the curable material may be flowed through the final device, when the first and second electrodes are mated together. In the final device the gap between the mated protrusions may only be the order of less than 5 mm, preferably in the range of from 0.5 to 5 mm. Vacuum filing techniques have been found to be insufficient to ensure that all of the gaps between the fins, therefore the use of at least one void provides a means of ensuring that greater reproducibility of filling is achieved.

In a preferred arrangement, the protrusions on the first and second electrodes may take the form of a series of circular patterns, which have diameters that allow close mating of said protrusions, without the presence of said voids, the dielectric would not be capable of flowing into the central cavities.

In a further embodiment, the at least one void may take the form of an elongate slot such that the patterns of the at least two protrusions are discontinuous, such as, for example, a substantially circular pattern of protrusions may preferably take the form of pairs of semi circular patterns, which the facilitate the flow of the dielectric in between the mated electrodes. In a further arrangement the at least one void may be a through hole, so as to allow the ingress of flowable dielectric material in the gap between co-located first and second electrode structures.

In an alternative arrangement the first and/or second electrodes comprise an insulator material coated with at least one layer of an electrically conducting material, to form a conducting electrode. One advantage is the reduction of mass of the first and second electrodes, as a significant proportion of the electrodes may be selected from lightweight man-made or natural polymers, ceramics, composites etc. A further advantage may be that the at least two protrusions may take the form of complex patterns or designs and therefore moulding polymers or composites into final shapes may be easier to achieve than complex machining of an electrode formed exclusively of metal. The insulator material may be coated using any known metal coating procedure, such as, for example, electroless deposition, electro deposition, chemical and/or physical vapour deposition techniques.

In a further aspect of the invention there is provided an electrical device comprising a capacitor according to the invention.

In a yet further aspect of the invention there is provided a method of preparing a capacitor according to the invention, comprising the steps of:
forming a first electrode comprising at least two protrusions,
forming a second electrode comprising at least two protrusions, which co-locate with the at least two protrusions on said first electrode.
bringing into alignment the first and second electrodes, causing a at least one curable dielectric material to enter the gap between said electrodes
causing said dielectric to cure.

Preferably, at least one layer of a high breakdown material is deposed and cured at the base of the first and second electrodes, prior to causing the at least one curable dielectric material to enter the gap between said electrodes.

As described hereinbefore, preferably the gap between the at least two protrusions on the first and second electrodes is of the order of a few millimeters, in a preferred option the first and second electrodes are located in a jig to maintain alignment between the at least two protrusions, so as to ensure a uniform gap. The curable dielectric may then be flowed into the gap and cured. As a further advantage of the presence of the at least one void, is that during the cure of the dielectric, any expansion of said dielectric will be mitigated by flow of material through the voids, such that the electrodes and their associated at least two protrusions maintain the desired gap. The absence of voids may then allow any concomitant expansion during the cure of the dielectric to push apart the mated electrode structure and cause mis-alignment of the electrodes.

An embodiment of the invention will now be described by way of example only and with reference to the accompanying drawings of which.

Figure 1:
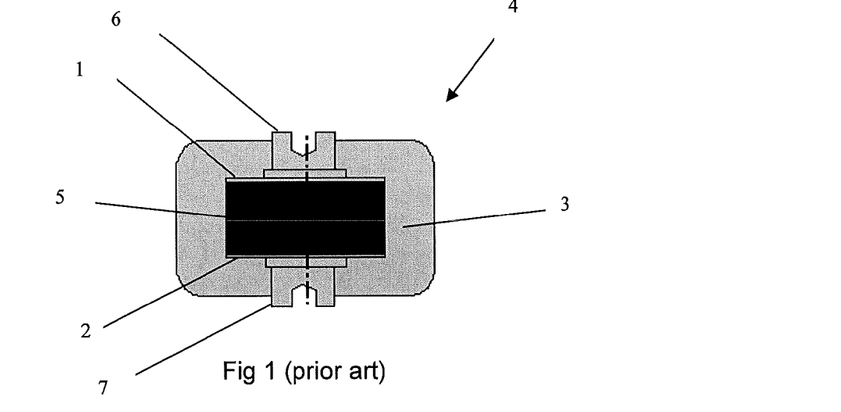
FIG. 1 shows a side view section of a prior art block capacitor

Turning to FIG. 1, a typical prior art block capacitor 4 which contains a first electrode 1 and a second electrode 2 sandwiching a block of dielectric material 5. The first electrode 1 is connected to an electrical contact 6 and the second electrode 2 is connected to an electrical contact 7. The capacitor structure is then encapsulated (potted) in a suitable potting material 3, so as to avoid electrical breakdown of the capacitor.

Figure 2A:
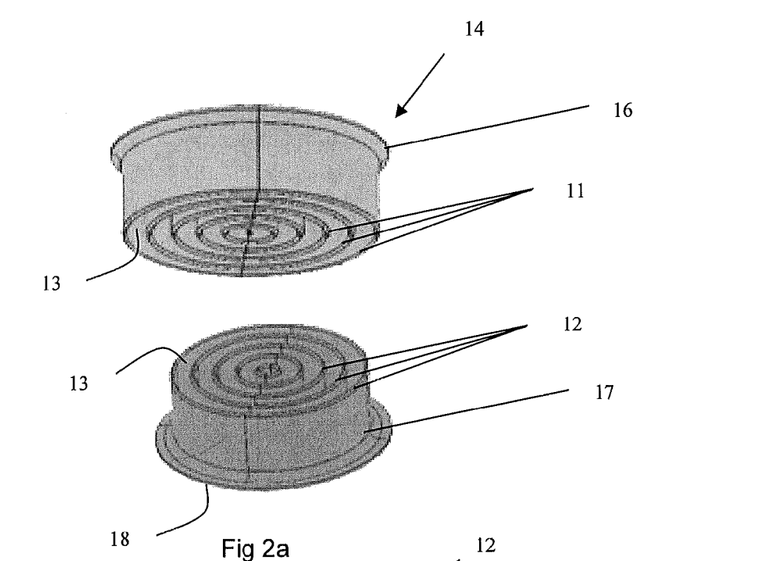
FIGS. 2a and 2b show a side view and rear view respectively of a cylindrical arrangement of protrusions

FIG. 2a shows a side projection of a capacitor set up 14, with a first electrode 16 with protrusions 11, and a second electrode 17, with protrusions 12. The protrusions 11 and 12 have been designed to mate together such that the height of the final mated capacitor plate is only a few millimeters thicker than the thickness of one of the electrodes with its associated protrusions. In between the protrusions 11 and 12, there is a defined gap 13, into which the opposing protrusion and the dielectric (not shown) will fit.

Figure 2B:
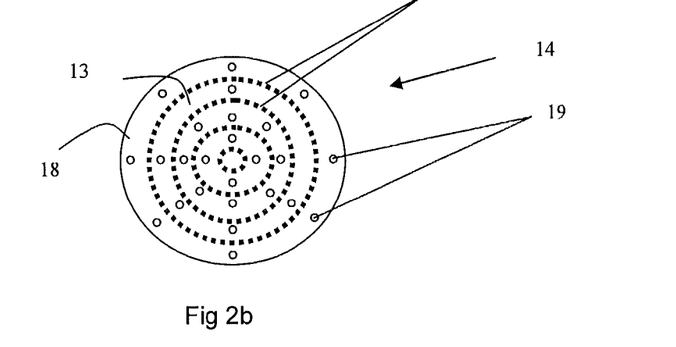

On the rear face 18 of the electrode 17, as shown in FIG. 2b, there is a plurality of voids 19, which extend as through holes, which are located in the electrode structure 17. The holes 19 permit the flow of a curable dielectric(not shown) into the gaps 13, between the protrusions(dotted lines) 12. Without the presence of the holes 19 the dielectric would not migrate in between the mated protrusions, as the likely gap between the two sets of mated protrusions 11 and 12 will be of the order of a few millimeters.

Figure 3:
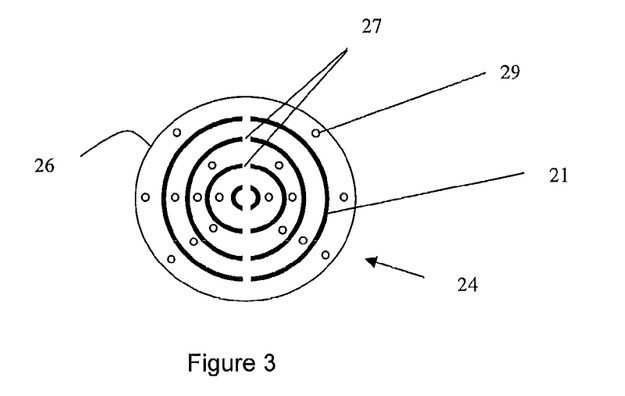
FIG. 3 shows a top view of one capacitor electrode with a split protrusion.

FIG. 3 shows a top view of one half of a capacitor 24, the electrode 26 has a series of upstanding protrusions 21, which define a generally semi-circular pattern, similar to that shown in FIG. 2. The generally circular pattern is broken up by voids in the form of slits 27, which extend the entire height of the protrusion 21. There are also additionally further voids in the form of through holes 29. The electrode 26, will have a mating pair, (not shown) similar to that shown in FIG. 2, with similar slits and holes. When the mated pair are brought together, the holes 29 and slits 27 allow dielectric material to be flowed evenly throughout the mated structure.

Figure 4A:
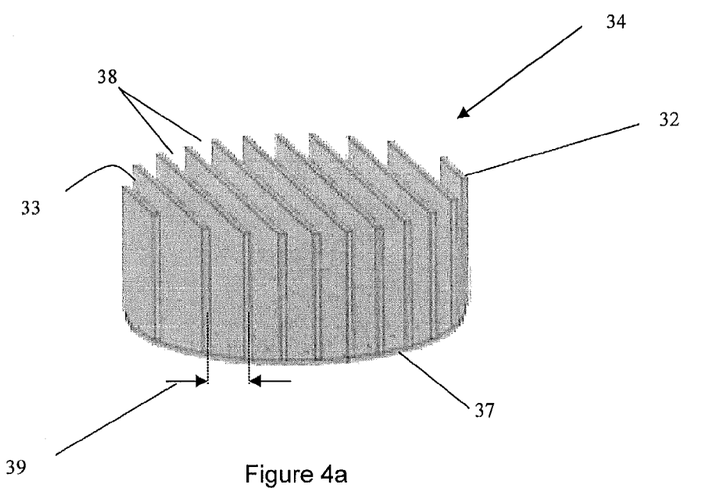
FIGS. 4a, and 4b provide side views of electrodes with fin like protrusions, and a mated structure respectively
Figure 4B:
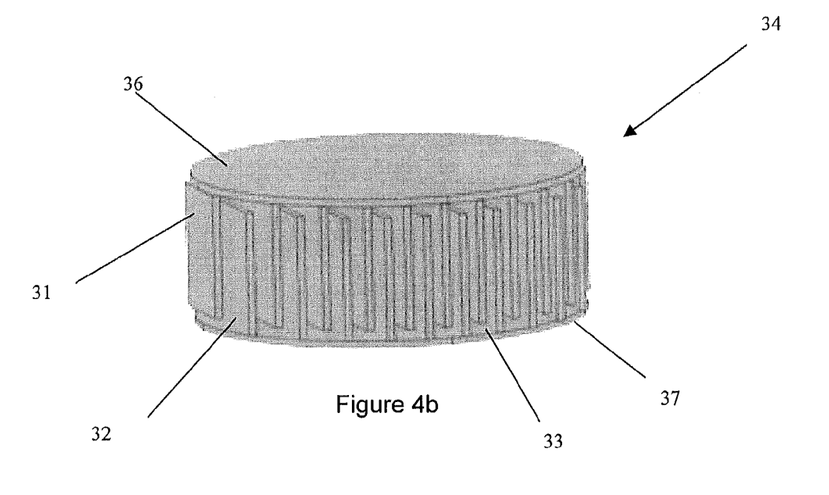

FIG. 4a shows a side projection of one half of a capacitor structure 34. The electrode 37 has a plurality of parallel fins 32, arranged with a gap 33 between each fin, the gap has a dimension 39 which permits the location of the corresponding protrusions 31, which are located on a second electrode 37, and the dielectric material. The outer circumference of the capacitor structure 34, has no perimeter, such that the open ends of the fins behave as slits 38, which readily permits the flow of a dielectric material between the gap when the fins are mated together as shown in FIG. 4b. FIG. 4b clearly shows the mating of the fins 31 and 32 which are the protrusions on electrodes 36 and 37, respectively.

Figure 5A:
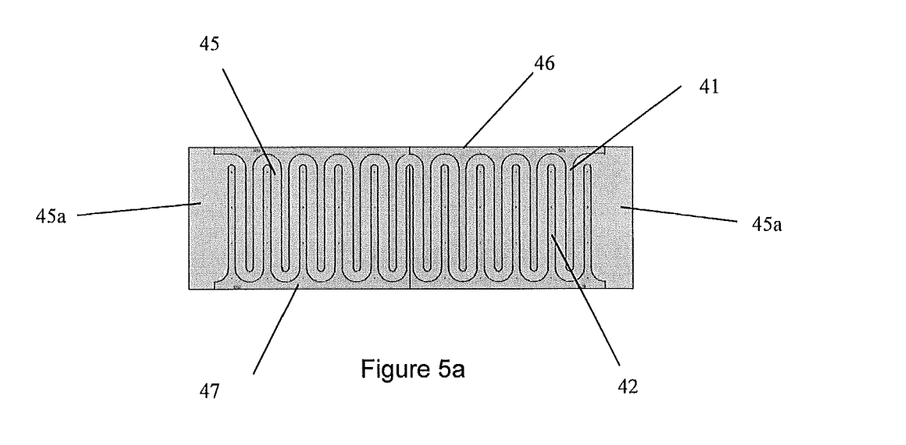
FIGS. 5a and 5b show a filled capacitor arrangement as shown in FIG. 2a, and an output from a model showing the electrical fields generated in an optimised capacitor of 5a, respectively.

FIG. 5a shows a cross-section of a mated structure of circular protrusions as shown in FIG. 2a. The capacitor comprises circular fins 41 on a first electrode 46 with mated with circular fins 42 on a second electrode 47, (as shown in FIG. 2a), the gap between the fins 41 and 42 has been filled with dielectric material 45. A reservoir of excess dielectric material 45a is shown at the distil ends of the drawing, the excess is there to ensure that there is sufficient dielectric to flow through the structure and to ensure all conductive areas of the electrodes 46 and 47 are encapsulated to ensure there is no potential for an electrical short.

Figure 5B:
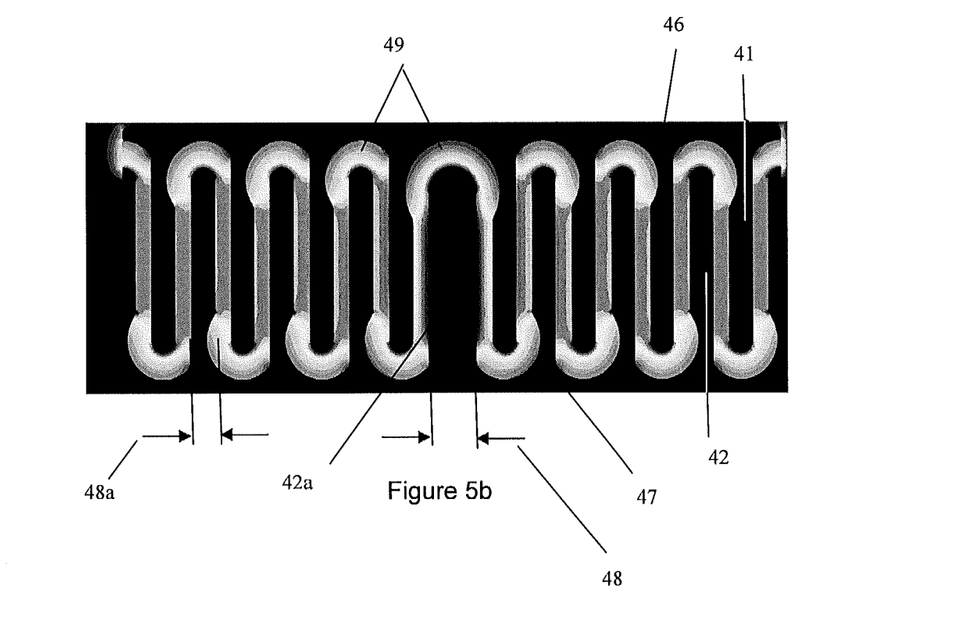

FIG. 5b shows a model of the electrical fields generated in a capacitor similar to that in FIG. 5a. The capacitor has been optimised, the first electrode 46 and second electrode 47 have been provided with complex geometries. The central protrusion 42a has been designed to be of a greater thickness 48 than the thickness of the other fins 48a. A further modification has been made the protrusions 41 42, by enlarging the radius of the rounded tips 49 of the protrusion. These modifications have reduced unwanted field enhancements.

Figure 6:
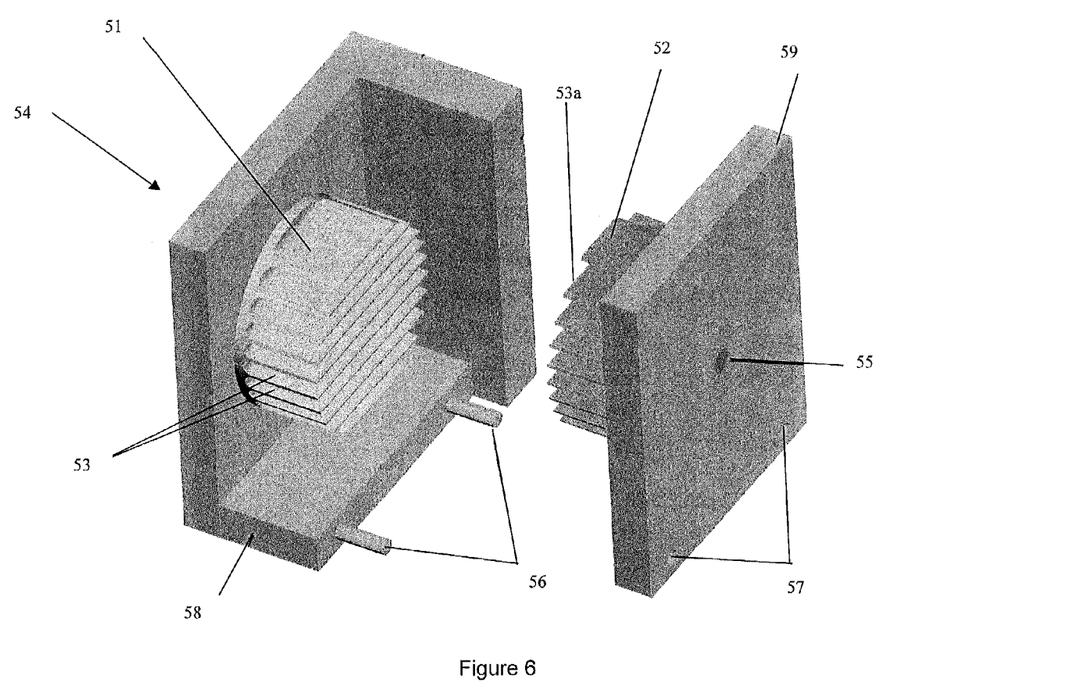
FIG. 6 shows a side projection of a jig assembly for aligning the protrusions on the electrode surface.

FIG. 6 shows one example of a jig arrangement 54, where the outer casing 58, 59 can be removed after construction of the capacitor. The jig 54 comprises two casing halves 58, 59 which hold the first electrode 51 and second electrode 52 respectively. The two halves 58, 59 are brought into alignment by locating lugs 56 and receiving holes 57. The thickness of the jig 59 ensures that the plurality of fins 53 and 53a engage to the correct depth. The action of the two halves 58, 59 and the thickness of jig 59 ensures that the fins 53 and 53a interlocate with a uniform spacing provided therebetween.

Figure 7A:
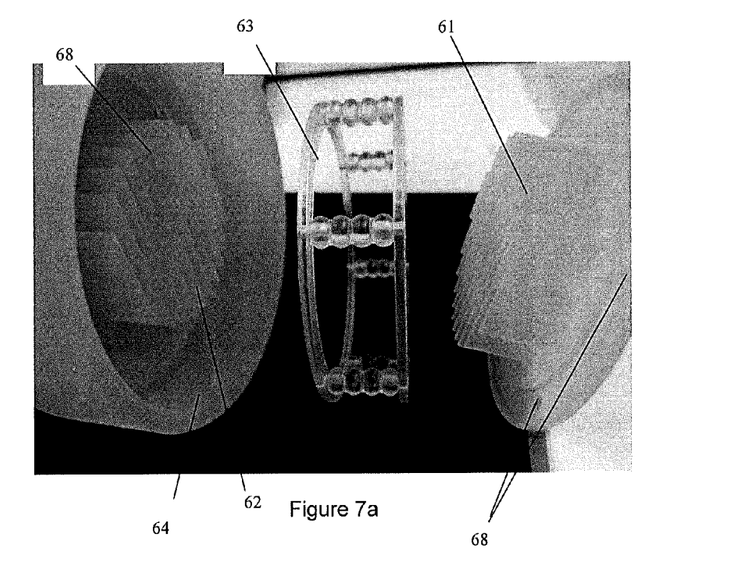
FIGS. 7a and 7b provide side views of a further jig assembly for a fin type arrangement.
Figure 7B:
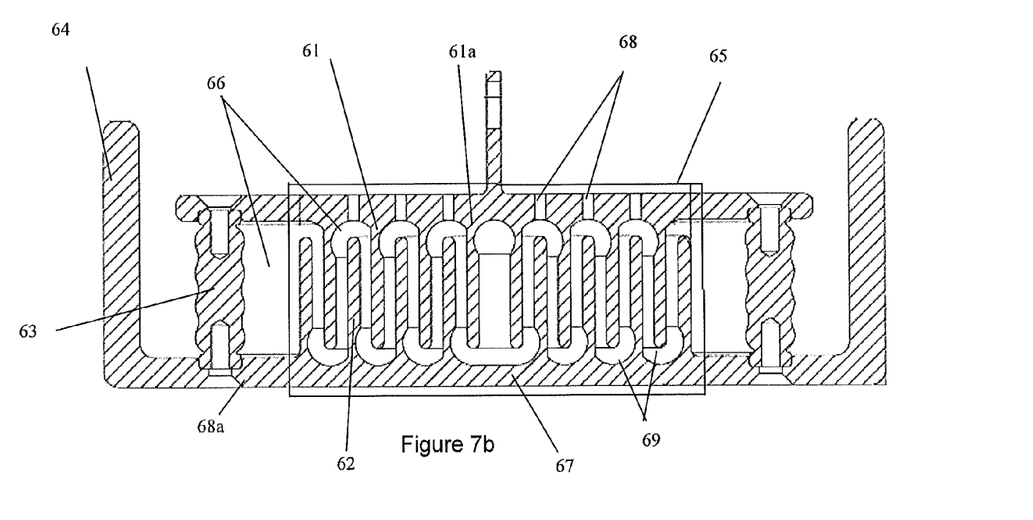

FIGS. 7a and 7b show a further arrangement with an integrated jig 63, which provides the correct spacings between the first electrode 61 and second electrode 62. The first and second electrodes have the fin type arrangement as shown in FIG. 4b. The central protrusion 61a has been designed to be of a greater thickness than the thickness of the other fins 61. The radii of the bottom of the fins 69 have been enlarged to provide rounded tips of the fin protrusions. The second electrode 62, has a an additional wall 64, so as to create a well so that the entire structure may be filled by a flowable dielectric. The gap 66 between the two electrodes is then filed by a flowable dielectric material to provide a final capacitor structure. To permit a more reproducible fill, fill holes 68 are located such that all of the gap 66 may be completely filled with dielectric material.

After the dielectric (not shown) has been cured, the area defined by box 65, is then machined away to remove the unwanted jig 63 and excess well area defined by wall 64.

Figure 8:
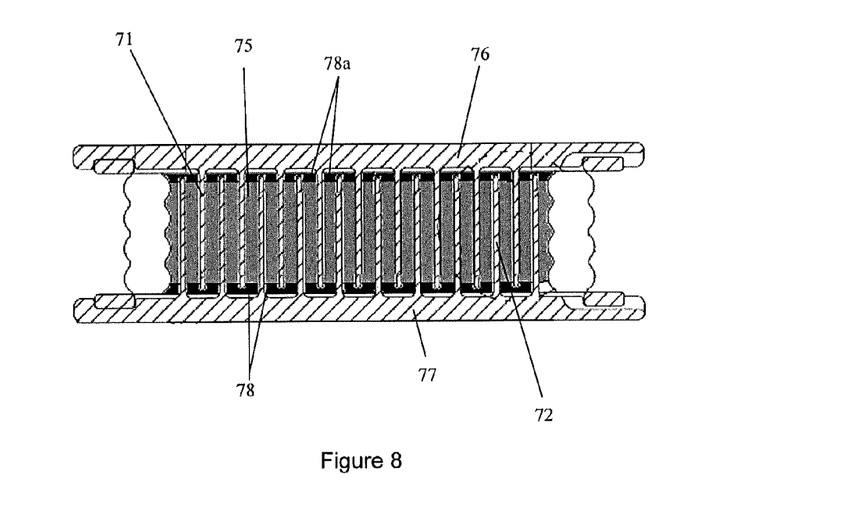
FIG. 8 show a filled capacitor arrangement as shown in FIG. 5a, wherein a high breakdown material is deposed on the first and second electrodes.

FIG. 8 shows a cross-section of a mated structure of circular protrusions as shown in FIG. 5a. The capacitor comprises circular fins 71 on a first electrode 76 with mated with circular fins 72 on a second electrode 77, (as shown in FIG. 5a), the gap between the fins 71 and 72 has been filled with dielectric material 75. The base portion of the first electrode 76, has deposed a thin layer of a high breakdown strength material 78a, similarly the base portion of the second electrode 77, has deposed a thin layer of a high breakdown strength material 78b.

The high breakdown material 78a, 78b, reduces breakdown between the tip of the fins of one electrode and the base portion of the adjacent electrode.

EXPERIMENTS

The capacitance was measured using an Agilent 4285a precision LCR meter. The samples were measured in air to allow estimation of the capacitance of the final infiltrated device comprising the flowable dielectric (Table 1). The measured capacitance values of the infiltrated structures agreed well with the tabulated values. The silver electrode coating resulted in a lower capacitance than the copper coating for the same capacitor design, primarily because the coating was thinner, thereby increasing the electrode spacing by ~150-200 microns.

TABLE 1

Capacitors with the same dimensions as a 1.7 nF TDK ceramic capacitor

| | Air dielectric capacitance | Ceramic composite dielectric capacitance | | | |
|---|---|---|---|---|---|
| | $e = 1$ | $e = 30$ | $e = 27$ | $e = 24$ | $e = 20$ |
| Stereolithographic structures revolved design (FIG. 2a) | | | | | |
| Exp 1 | 0.0104 nF silver paint | 3.1 nF | 2.8 nF | 2.5 nF | 2.0 nF |
| Exp 2 | 0.054 nF copper coating | 1.6 nF | 1.46 nF | 1.3 nF | 1.0 nF |
| Exp 3 | 0.064 nF silver paint | 1.9 nF | 1.7 nF | 1.5 nF | 1.3 nF |
| Exp 4 | 0.078 nF copper coating | 2.3 nF | 2.1 nF | 1.9 nF | 1.6 nF |
| Interlocking fin (FIG. 4b) | | | | | |
| Exp 5 | 0.070 nF copper coating | 2.1 nF | 1.9 nF | 1.7 nF | 1.4 nF |
| Exp 6 | 0.086 nF silver paint | 2.6 nF | 2.3 nF | 2.0 nF | 1.7 nF |
| Metallic structures (Cu) Interlocking fin (FIG. 4b) | | | | | |
| Exp 7 | 0.09 pF | 2.8 nF | 2.43 nF | 2.16 nF | 1.8 nF |
| Exp 8 | 0.075 pF | 2.25 nF | 2 nF | 1.8 nF | 1.5 nF |

The results in Table 1 clearly show that capacitors that manufactured from a polymer via stereolithographic means and coated with a conductor, preferably a metal, provide comparable capacitance values to capacitors which are constructed from an entirely metal substrate. The use of metal coated polymers for the first and second electrodes provides a the advantage of a means for rapid manufacture techniques, at a much reduced cost than a similar electrode manufactured from metal.

Table 2 below shows the effect using modelling software of providing a radii at the base of a protrusion on the level of field enhancement.

TABLE 2

| Revolved capacitor design (FIG. 2a) | C/nF | Field enhancement factor |
|---|---|---|
| 1 mm thick concentric walls no rounding | 3.0 | >3 |
| 2 mm thick walls and lobes added however no room for outer ceramic composite layer | 2.2 | 1.5 |
| Remove outermost wall to allow addition of an outer ceramic composite layer | 1.6 | 1.5 |
| Remove centre pin and shift all the walls to allow for an additional concentric ring | 2.4 | 1.5 |

A circular (revolved) capacitor structure was selected, of the type shown in FIG. 2a. The capacitance of each set up was measured as the radii of the protrusions were altered. The first iteration was a series of protrusions, which were each 1 mm thick. The next iteration was a 2 mm thick wall, however in practice this would leave minimal room for dielectric material. However, it is apparent that the field enhancement factor has been reduced by enlarging the radius. The third iteration comprised further erosion of the co-located electrode, by removing portions of the wall. The fourth iteration was to remove the thin central pin, and replacement by a further concentric ring. This provided a significantly increase capacitance value and a concomitant reduction in the unwanted field enhancement.

The invention claimed is:

1. A capacitor comprising:
   a first electrode having at least two protrusions;
   a second electrode having at least two protrusions, which interlocate with the protrusions on said first electrode; and
   at least one curable dielectric material deposed between said interlocated protrusions of the said first and second electrodes, wherein there is at least one void in the first or second electrode, to allow the curable dielectric material to be flowed therethrough.

2. A capacitor according to claim 1, wherein said protrusions have a cross section whose sides are parallel, curved, or substantial circular.

3. A capacitor according to claim 2, wherein the at least two protrusions on the first and second electrodes form interlocating patterns.

4. A capacitor according to claim 3 wherein there is a plurality of voids located in the first and/or second electrodes.

5. A capacitor according to claim 3, wherein the at least one void is located in the at least two protrusions of the first or second electrode.

6. A capacitor according to claim 5 wherein the at least one void is an elongate slot such that the patterns are discontinuous.

7. A capacitor according to claim 1, wherein the at least two protrusions on the first and second electrodes form interlocating patterns.

8. A capacitor according to claim 7, wherein the interlocating patterns are parallel, curved or circular.

9. A capacitor according to claim 7 wherein the at least one void is an elongate slot such that the patterns are discontinuous.

10. A capacitor according to claim 1 wherein there is a plurality of voids located in the first and/or second electrodes.

11. A capacitor according to claim 1, wherein the at least one void is located in the at least two protrusions of the first or second electrode.

12. A capacitor according to claim 1 wherein the first and/or second electrode comprises:
    an insulator material coated with at least one layer of an electrically conducting material, to form an electrode.

13. A capacitor according to claim 1 wherein edges of the at least two protrusions are provided with a radius.

14. A capacitor according to claim 1 wherein the curable dielectric is selected from a polymer or ceramic loaded polymer.

15. A capacitor according to claim 1 wherein at least one layer of a high breakdown material is deposed at a base of each of said first and second electrodes.

16. An electrical device comprising:
    a capacitor according to claim 1.

17. A method of preparing a capacitor according to claim 1, comprising:
    forming a first electrode having at least two protrusions
    forming a second electrode having at least two protrusions, which co-locate with the at least two protrusions on said first electrode;
    bringing into alignment the first and second electrodes, causing at least one curable dielectric material to enter a gap between said electrodes; and
    causing said dielectric to cure.

18. A method according to claim 17, comprising:
    deposing and curing at least one layer of a high breakdown material at a base of each of the first and second electrodes, prior to causing the at least one curable dielectric material to enter the gap between said electrodes.

19. A method according to claim 18, wherein the first and second electrodes are located in a jig to maintain alignment between the at least two protrusions.

20. A method according to claim 17, wherein the first and second electrodes are located in a jig to maintain alignment between the at least two protrusions.

* * * * *